(12) United States Patent  
McCollough, Jr.

(10) Patent No.: US 7,072,163 B2
(45) Date of Patent: Jul. 4, 2006

(54) METHOD AND APPARATUS FOR A REMOTE ELECTRIC POWER LINE CONDUCTOR FAULTED CIRCUIT CURRENT MONITORING SYSTEM

(76) Inventor: Norman D McCollough, Jr., 182 McCoy Rd., Sharon, NH (US) 03458

( * ) Notice: Subject to any disclaimer, the term of this patent is extended or adjusted under 35 U.S.C. 154(b) by 0 days.

(21) Appl. No.: 10/711,998

(22) Filed: Oct. 19, 2004

(65) Prior Publication Data

US 2006/0082942 A1     Apr. 20, 2006

(51) Int. Cl.
*H02H 3/08* (2006.01)
*H02H 9/02* (2006.01)
*G08B 21/00* (2006.01)

(52) U.S. Cl. .............. 361/93.1; 340/658; 340/664
(58) Field of Classification Search ........... 361/93.1; 340/442, 658, 664
See application file for complete search history.

(56) References Cited

U.S. PATENT DOCUMENTS

| | | | |
|---|---|---|---|
| 3,806,905 A | 4/1974 | Strenglen | 340/442 |
| 3,922,659 A | 11/1975 | Dighe | 340/652 |
| 4,176,350 A | 11/1979 | Patterson | 340/652 |
| 4,450,431 A | 5/1984 | Hochstein | 340/442 |
| 4,616,216 A | 10/1986 | Meirow et al. | 340/652 |
| 4,829,298 A * | 5/1989 | Fernandes | 340/870.27 |
| 4,918,423 A | 4/1990 | Fukuyama et al. | 340/442 |
| 5,003,426 A | 3/1991 | Yeh et al. | 361/59 |
| 5,010,438 A | 4/1991 | Brady | 361/56 |
| 5,959,537 A | 9/1999 | Banting et al. | 340/664 |

* cited by examiner

*Primary Examiner*—Brian Sircus
*Assistant Examiner*—Dharti H. Patel

(57) ABSTRACT

An electric power line characteristic apparatus and monitoring method allows automatic conductor current data logging of maximum current magnitudes and data storage for later retrieval in a remote electric power line conductor faulted circuit current monitoring system 2. The apparatus and method includes, from a remotely located exciter 3 apparatus using an antenna 5 to transmit a specific frequency and code key to an antenna 10 of an electric power line conductor faulted circuit current monitoring apparatus associated with the electric power line phase conductor. Additionally the method and apparatus includes a delay circuit to allow a fixed delay time before the faulted circuit monitor responds to the instantaneous re-application of power to the conductor after a fault. This fixed period of time for the current to settle to a nominal value constitutes an inrush delay time before the faulted circuit monitor responds to the current level flowing in the power line. The apparatus and method further includes the step of, at the conductor fault current monitor, in response to a specific frequency and code key, transmitting a specific signal in response to convey data. The data are received at the exciter and stored into the memory of the exciter for later downloading to a host PC. The apparatus and method collects data from multiple faulted circuit monitors in the exciter and stores the data.

13 Claims, 3 Drawing Sheets

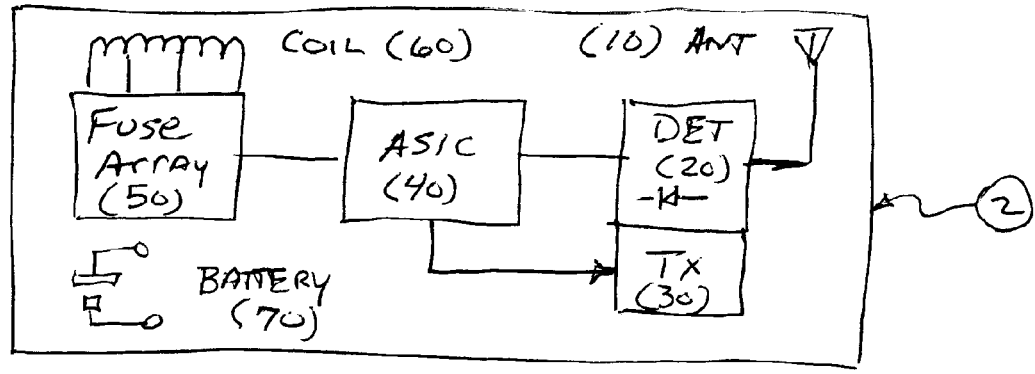
FAULTED CIRCUIT MONITOR (FCM)
FIG 2
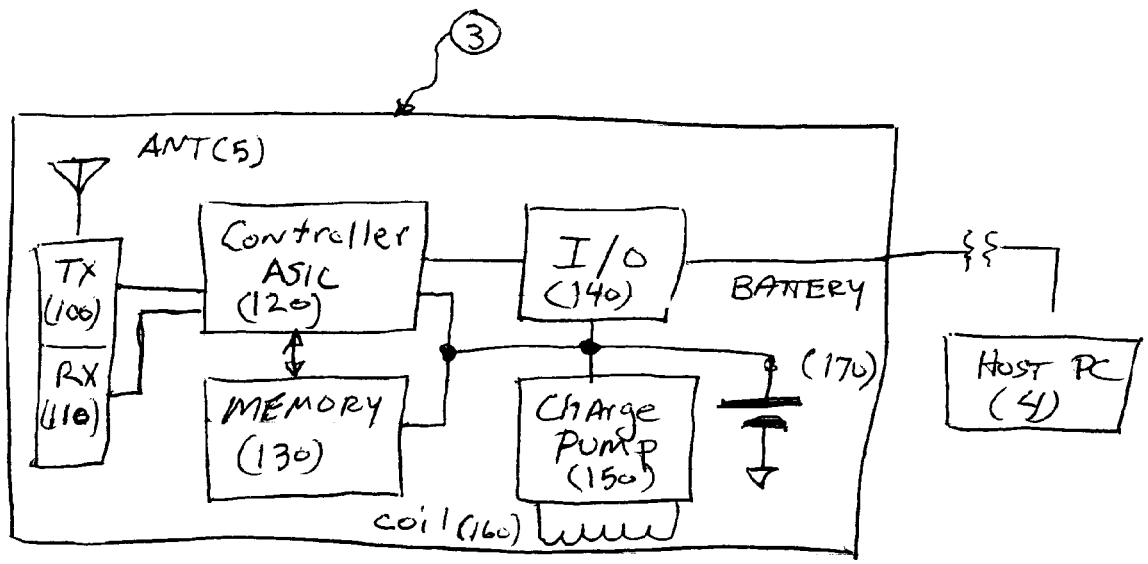
EXCITER    FIG 3

METHOD AND APPARATUS FOR A REMOTE ELECTRIC POWER LINE CONDUCTOR FAULTED CIRCUIT CURRENT MONITORING SYSTEM

BACKGROUND

The present invention is generally related to a method and apparatus for monitoring the characteristics of the current flowing in a power line conductor 1 under a normal or a faulted circuit condition.

Systems have been developed to indicate a power line conductor under a faulted circuit condition, and to report the characteristic to a receiver using radio transmissions.

One problem with such systems is that they can only indicate if a specific maximum single level "trip" current was exceeded. They cannot report any specific faulted circuit current levels or preset steps.

A further limitation is the time the present systems report the data. In a typical application, the data are transmitted for 4, 8, or 24 hours then they automatically reset and information is lost. The reset limitation is also due to limited battery life in the device and a requirement that low maintenance of the device on the power line is required typically 5 years or longer.

SUMMARY

The present invention is directed to an improved remote faulted circuit monitoring system that will hold the magnitude of the current that flowed during the faulted condition of the power line conductor. The data are held indefinitely. No battery is present in the faulted circuit monitoring device, although it is possible to use a battery in the application. By way of introduction only, in one embodiment, the faulted circuit monitor is activated by detection of the specific frequency and key code from the nearby exciter. In response to the specific frequency and key code, the faulted circuit monitor transmits fault data in the form of a maximum stepped current level preset to magnitudes of 50, 100, 200, 500, 1000, 2000, and 5000 amperes. Self-healing fuses or instantaneous one-time fuses hold the maximum level as induced from the power line conductor under normal or faulted condition. A delay circuit may further be included in the array of fuses to allow for an "inrush restraint" to report only the true magnitude of the current level flowing in the power line conductor.

The foregoing discussion of the preferred embodiments has been provided only by way of introduction. Nothing in this section should be taken as a limitation on the following claims, which define the scope of the invention.

BRIEF DESCRIPTION OF THE DRAWINGS

FIG. 2. is the simplified block diagram of the faulted circuit monitor.

FIG. 3. is the simplified block diagram of the exciter unit.

DETAILED DESCRIPTION OF THE PRESENTLY PREFERRED EMBODIMENTS

Figure 1:
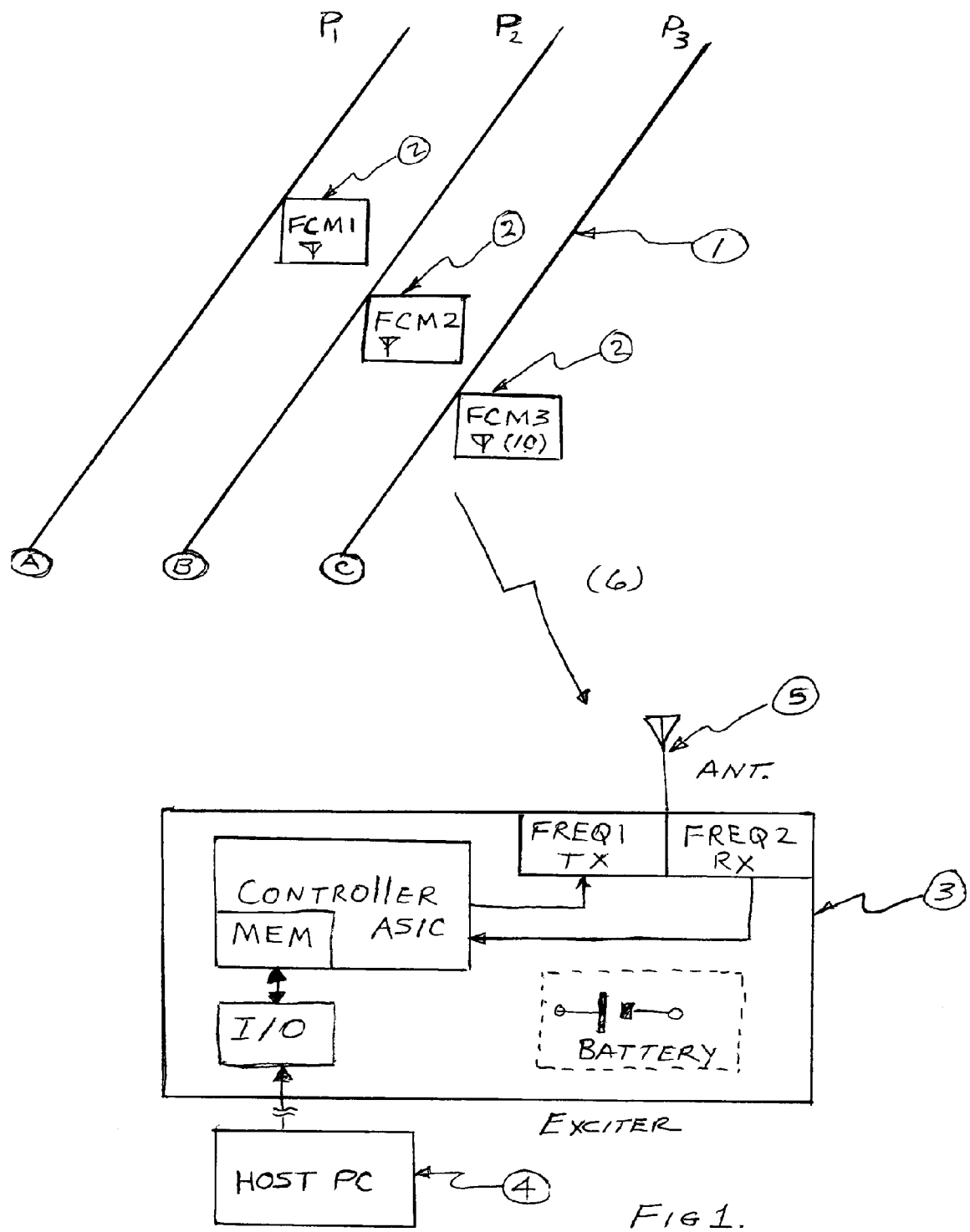
FIG. 1. is the block diagram of the remote faulted circuit monitoring system.

Referring now to the drawings, FIG. 1. shows three Faulted Circuit Monitor (FCM) 2 devices located on the individual phase conductors, P1, P2, and P3 1 of the electric utility power lines. Radio frequency transmissions are sent from the antenna 5 of the exciter 3 to the faulted circuit monitors 2. Contained in these transmissions is the code key for the individual faulted circuit monitor. Anti-collision protocols are implemented in the faulted circuit monitors 2 such that only the faulted circuit monitor having a matching code key will respond to the exciter 3 signal. In this example, the diagram further shows an exciter 3 unit collecting data from the individual phase conductor faulted circuit monitors FCM(1), FCM(2), and FCM(3). The System of 3 further includes an I/O section for transferring the stored data to a host portable computer 4. The exciter 3 is configured to be portable and operate proximate to the faulted circuit monitors 2.

Now referring to FIG. 2., the faulted circuit monitors themselves are shown. Once the faulted circuit monitor 2 has received rf energy from the exciter 3 for some small interval of time, the unit will power up using the rectified 20 rf energy for power and receive a valid code key from the exciter 3. A battery 70 may also be used to provide power to the device, however, the operational lifetime of the battery can be short and would be less than optimal except as a diagnostic device in a temporary deployment.

Again referring to FIG. 2, if the code key transmitted from the exciter 3 matches the code key stored in the ASIC 40 of the faulted circuit monitor, the faulted circuit monitor will respond with data from the fuse array 50. If the code key transmitted by the exciter does not match the internal code key in the faulted circuit monitor, the faulted circuit monitor will go into a power saving sleep mode of operation.

The fuse array 50 may be one of a one time use fuse device array or a self healing fuse device array. The current flowing in line conductor P1 is inductively coupled to the fuse array by a coil 60. The coil 60 is a multi-tapped inductor used to couple a portion of the line current into the fuse array 50. The induced current will open specific fuses in the fuse array corresponding to a relative current level flowing in the line conductor. The circuitry of coil 60 and the fuse array 50 operate with only the induced current from the power line conductor and no other electrical power is required. The data from the fuse array 50 can be a collection of data addresses for the ASIC 40.

Referring to FIGS. 2 and 3., the exciter 3 unit has the transmitting and receiving antenna 5 to transmit the rf energy 100 of a specific frequency to the remotely located faulted circuit monitor 2 through antenna 10. When the exciter 3 unit is brought in proximity to the faulted circuit monitor 2, the operator initiates a signal transmission from the exciter 3. If the code keys match, data collected by fuse array 50 will be directed to the ASIC 40 for transmission by a particular modulation scheme by rf transmitter 30 and antenna 10.

Design of the particular rf modulation scheme capable of encoding the data collected in the fuse array is well within the skill level of those ordinarily skilled in the art.

Once the data have been received at antenna 5 and demodulated by receiver 110 and by controller ASIC 1 20, the data are stored in the exciter memory 130. The data will be stored until downloaded thru I/O driver 140 to a host portable computer 4. A rechargeable battery 170 internal to the exciter will power the exciter. A charge pump circuit 150 and coil 160 may be used to boost the battery voltage as needed to provide adequate time-of-use of the exciter unit in the field application.

Figure 4:
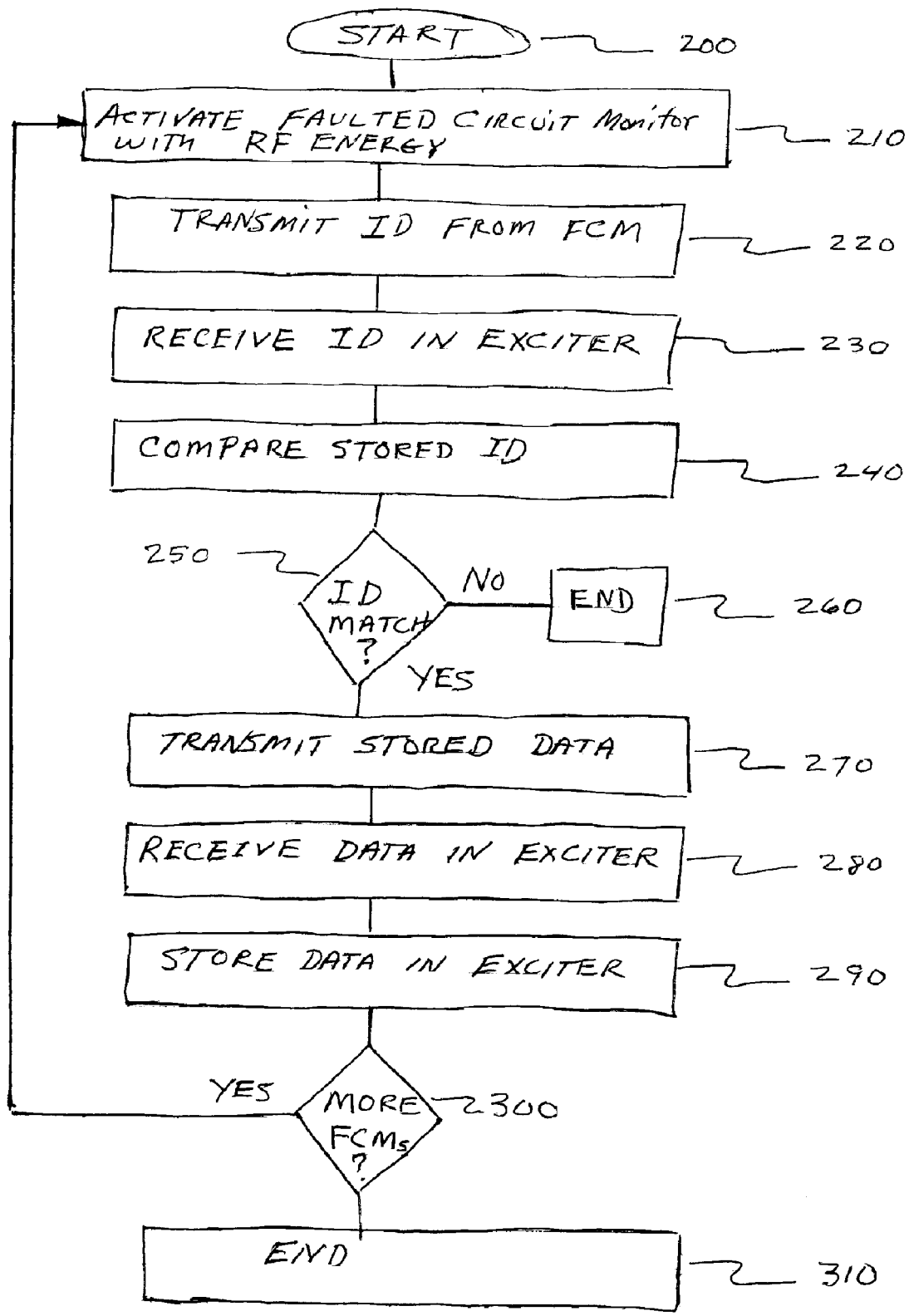
FIG. 4. is the flow diagram illustrating the operation of the remote faulted circuit monitoring system.

The passive specific frequency embodiment uses technology similar to that used in radio frequency identification (RFID) tags that use the rectified radiated rf energy as the internal power source of the faulted circuit monitor device. FIG. 4 is the flow diagram of the faulted circuit monitoring system 2 and the exciter 3 illustrating the method of operating the remote faulted circuit monitoring system. In the illustration of FIG. 4, the method begins at step 200. At step 210, the rf energy 6 is radiated from the exciter antenna 5 to the faulted circuit monitor antenna 10. The close proximity of the exciter thus radiates a specific rf frequency and is received by the faulted circuit monitor 3 where the detector circuit 20 rectifies the received energy. The received energy is converted by the detector into a direct current sufficient for supplying power to the ASIC 40 and the transmitter, TX, 30. After the initial supply of power the ASIC compares a code key received to a code key stored in the ASIC 40. In step 210, after a successful comparison of the two sequences, the ASIC 40 activates. In step 220, the ASIC sends a particular series of ones and zeros to the transmitter 30. This sequence of ones and zeros comprises an RF modulation scheme to convey data to the exciter 3. The data comprises the "ID" of the faulted circuit monitor.

At step 230, the exciter receives the faulted circuit monitor "ID". The ID is unique for each faulted circuit monitor. In step 240, the exciter compares the "ID" of the faulted circuit monitor to the set of "ID's" stored in the exciter memory. Upon the successful comparison in step 250 results in a send data command to the faulted circuit monitor. If no matching ID's are received by the exciter, the program ends.

In step 270, the data are read from the fuse array 50 by the ASIC 40 and are transmitted to the exciter as a series of rf pulses corresponding to a particular set of fuses that are active in the fuse array 50.

At step 280, the transmitted series of rf pulses are received in the exciter and de-modulated as a series of binary ones and zeros conveying the state of the fuse array 50. In step 290, received information is stored in the memory 130 of the exciter.

In step 300, the exciter will attempt to activate more faulted circuit monitors by the method outlined in steps 210 through 250 using a different uniquely coded code key.

If a valid response is detected as in step 210, the method of acquiring the data information will continue as steps 220 to 290 depict. The method will continue until no further valid code keys are received and no further data is stored in the memory of the exciter. In step 300, the program terminates.

Data will be sent from the exciter to the host PC 4 over a serial data link via the I/O 140 section of the exciter in response to a host 4 command to send the stored data in the exciter memory 130.

Location, pole number, gps data or any number of enumeration and identification schemes used by the electric utility may be entered either electronically or manually into the host pc 4 for later use in determining the path of current flow based in the magnitude information conveyed from the faulted circuit monitor.

From the foregoing it can be seen that the present invention provides an improved method of a remote faulted circuit monitoring system and method.

While a particular embodiment of the present invention has been shown and described, modifications may be made. For example, batteries may be used in a device that provides a diagnostic tool for deployment along troublesome power lines having problems that heretofore were difficult to pinpoint in a large power system. Once the problems were diagnosed, the units would be collected for later use.

What is claimed is:

1. A method for determining a maximum current flow in the electric power line conductor (1) under faulted circuit conditions, the method comprising:
   (a) in the field environment, applying a specific frequency activation signal and code key from an exciter positioned proximate to a faulted circuit monitoring apparatus located on the power line conductor;
   (b) activating said faulted circuit monitoring apparatus by way of said specific frequency activation signal and code key;
   (c) at the exciter, detecting a data signal from the faulted circuit monitoring apparatus, the data produced by modulating a specific frequency faulted circuit monitor in response to a measured current parameter;
   (d) at the exciter, receiving the faulted circuit data from the data signal;
   (e) associating the faulted circuit current magnitude with the conductor phase information for the particular faulted circuit monitor unit; and
   (f) repeating steps (a), (b), (c), (d) and (e) for all power line phase conductors on an electric power line.

2. The method of claim 1 wherein applying a specific activation signal comprises applying an un-modulated signal having a specific frequency chosen to resonate with an rf detection circuit (20) of the faulted circuit monitor.

3. The method of claim 1 where in the fault current response time of the faulted circuit monitor is slowed to allow for "inrush" conditions on the power line.

4. The method of claim 2 wherein applying a specific frequency activation signal comprises applying a specific frequency or two distinct frequencies close to one another.

5. The method of claim 1 wherein applying a specific activation signal comprises positioning the exciter apparatus near the faulted circuit monitor to actuate the faulted circuit monitor with the specific frequency signal.

6. The method of claim 1 wherein a specific code key pattern of binary data are transmitted from the exciter by modulation of the rf signal.

7. The method of claim 1 wherein the faulted circuit monitor apparatus responds to only a match with the exciter transmitted code key.

8. The method of claim 1 wherein detecting a data signal from the faulted circuit monitor comprises:
   Detecting faulted circuit current magnitude information from the faulted circuit monitor data signal.

9. The method of claim 1 wherein detecting the data signal from the faulted circuit monitor comprises:
   Detecting an impedance modulation of a radiated rf field of the exciter; and decoding the data as the impedance modulation by operation of the faulted circuit monitor.

10. The method of claim 9 comprising sequentially associating detected identification information with respective power line conductor phases.

11. The method of claim 1 further comprising the step of downloading the faulted circuit monitor data and communicating the data over a hard wire link, a wireless link, or a network.

12. The method of claim 11 wherein communicating data comprises:
   establishing a temporary connection between the exciter and the host pc;
   conveying the data from the exciter to the host pc over the temporary connection;
   and breaking the temporary connection.

13. The method of claim 1 wherein said faulted circuit monitoring apparatus is powered by said specific frequency activation signal.

* * * * *